(12) United States Patent
Hongjun et al.

(10) Patent No.: US 11,782,182 B2
(45) Date of Patent: Oct. 10, 2023

(54) SYSTEMS AND METHODS FOR COMBINED PHYSICAL AND NUMERICAL SIMULATION OF SUBTERRANEAN CHARACTERISTICS

(71) Applicants: Research Institute of Petroleum Exploration and Development, Beijing (CN); Southwest Petroleum University, Sichuan (CN)

(72) Inventors: Wang Hongjun, Beijing (CN); Guo Chunqiu, Beijing (CN); Chen Pengyu, Beijing (CN); Yue Ping, Sichuan (CN); Xing Yuzhong, Beijing (CN)

(73) Assignees: Research Institute of Petroleum Exploration and Development, Beijing (CN); Southwest Petroleum University, Chengdu (CN)

( * ) Notice: Subject to any disclaimer, the term of this patent is extended or adjusted under 35 U.S.C. 154(b) by 682 days.

(21) Appl. No.: 16/537,545

(22) Filed: Aug. 10, 2019

(65) Prior Publication Data

US 2021/0041597 A1 Feb. 11, 2021

(51) Int. Cl.
*G01V 99/00* (2009.01)
*G06F 30/20* (2020.01)
*G06F 111/10* (2020.01)

(52) U.S. Cl.
CPC ............ *G01V 99/005* (2013.01); *G06F 30/20* (2020.01); *G06F 2111/10* (2020.01)

(58) Field of Classification Search
CPC .... G01V 99/005; G06F 30/20; G06F 2111/10
See application file for complete search history.

(56) References Cited

U.S. PATENT DOCUMENTS

| 4,649,737 A | 3/1987 | Jones |
| 4,688,238 A | 8/1987 | Sprunt et al. |
| 4,799,382 A | 1/1989 | Sprunt et al. |

(Continued)

FOREIGN PATENT DOCUMENTS

WO WO-2010040202 A1 * 4/2010 ......... E21B 43/2408

OTHER PUBLICATIONS

Ning, Xiuxu, et al. "The measurement of matrix and fracture properties in naturally fractured cores." Low Permeability Reservoirs Symposium. OnePetro, 1993. (Year: 1993).*

(Continued)

*Primary Examiner* — Boris Gorney
*Assistant Examiner* — Joshua E. Jensen
(74) *Attorney, Agent, or Firm* — Victor H. Segura

(57) ABSTRACT

Techniques for modeling subterranean characteristics by combining physical and numerical simulations using limited amounts of subsurface full diameter core samples via orthogonal experimentation schemes. Systems and methods applying synchronous fitting and prediction of physical simulation and numerical simulation to obtain the equivalent permeability of fracture cells in numerical simulation, to provide a basis for assigning a value to the equivalent fracture cell permeability during numerical simulation. According to the specific subterranean reservoir characteristics, the water invasion orthogonal experiments are completed by combining physical simulation with numerical simulation to analyze the main factors of water invasion in reservoirs.

20 Claims, 5 Drawing Sheets

(56) References Cited

U.S. PATENT DOCUMENTS

| | | | | |
|---|---|---|---|---|
| 4,907,442 | A | * | 3/1990 | Jones ................ G01N 27/221 |
| | | | | 324/376 |
| 5,493,226 | A | | 2/1996 | Honarpour et al. |
| 6,023,656 | A | | 2/2000 | Cacas et al. |
| 8,356,510 | B2 | | 1/2013 | Coenen |
| 2013/0276554 | A1 | * | 10/2013 | Matthews ............ E21B 49/00 |
| | | | | 269/287 |
| 2016/0040533 | A1 | * | 2/2016 | Harrison ............ E21B 49/088 |
| | | | | 73/152.05 |
| 2017/0004650 | A1 | * | 1/2017 | Caliskan ............... E21B 25/00 |
| 2018/0306016 | A1 | * | 10/2018 | Safonov ............... C09K 8/604 |

OTHER PUBLICATIONS

Lutynski, Marcin A. "A method of proppant pack permeability assessment." Physicochemical problems of mineral processing 51 (2015). (Year: 2015).*

Shu, Biao, et al. "Evolution of permeability in a single granite fracture at high temperature." Fuel 242 (2019): 12-22. (Year: 2019).*

Zhang, Lei, et al. "The investigation of permeability calculation using digital core simulation technology." Energies 12.17 (2019): 3273 (Year: 2019).*

* cited by examiner

SYSTEMS AND METHODS FOR COMBINED PHYSICAL AND NUMERICAL SIMULATION OF SUBTERRANEAN CHARACTERISTICS

FIELD OF THE INVENTION

The present disclosure relates generally to methods and systems for modeling characteristics of subterranean regions using core samples in a combined physical and numerical simulation process.

BACKGROUND

In the exploration and production of hydrocarbons, certain lithological or petrophysical properties of subsurface reservoirs are routinely determined as an aid in improving and/or maximizing production from target reservoirs. It is common practice to take, when an exploration or production well is being drilled, one or more core samples of the subsurface region and to subsequently perform tests with the core sample. Conventional coring tools and coring techniques are further described in Patent Pub. Nos. US20130081879 A1 and US 20140090893 A1.

In current physical simulation core experiments for high-temperature, high-pressure oil and gas reservoirs, the temperature and pressure simulation conditions are strict. In full-diameter core experiments, the pressure can typically exceed 70 MPa, the temperature can exceed 120° C., the cost of a single group of experiments is generally 10-20 times that of a conventional core test, the experimental cycle is 5-10 times that of the conventional experiment, and the success rate of experimentation is not very high. Additionally, the cost of coring is high and core quantity is typically limited.

For analysis evaluation experiments of variable factors, the orthogonal experimentation method is an effective tool. The basis of an orthogonal experiment is to keep the same basic parameters of test objects. Only in this way can the experiment remain homogeneous, uniform, and comparable. Thus, theoretically, only artificial cores can be used to realize controllability and uniformity of the basic parameters of test objects. However, artificial cores cannot represent the true conditions of oil and gas reservoirs.

If an orthogonal experiment is conducted using a true core, the core physical parameters (porosity and permeability) are required to be similar and large in quantity. For orthogonal experiments of three factors at three levels, at least nine experiment cases are needed, and a large number of cores are required. However, in fact, not only do different fractured carbonate reservoirs have very different physical characteristics, but fractured carbonate reservoirs also have low core recovery and an extremely limited number of full-diameter cores can be obtained, so it is difficult to obtain enough full-diameter cores with similar basic physical characteristics to use for simulation experiments.

Numerical simulation can replace some physical simulation, but a precondition is that physical simulation experiments be available for reference, comparison, correction and calibration to numerical simulation. In some extreme conditions, abnormally strong heterogeneity caused by permeability differences (e.g., after fractures are produced in the core, large aquifer volume connecting reservoirs, etc.) can all lead to convergence problems or systematic error in numerical simulation, giving rise to unreliable simulation results. Thus, a need remains for improved techniques to apply physical simulation and numerical simulation in the analysis of subterranean reservoirs.

SUMMARY

According to an aspect of the invention, a method for modeling a characteristic of a subsurface region is disclosed. In this embodiment, parameters for a numerical model are established using characteristics associated with a subsurface region; at least one core sample is obtained from the subsurface region; physical characteristics of the at least one core sample are determined; a fracture is created on the at least one core sample; physical experiments are performed on the at least one fractured core sample; physical characteristics of the at least one fractured core sample are determined; the physical characteristics of the at least one fractured and unfractured core sample are compared; the numerical model parameters are adjusted based on the comparison of at least one fractured and unfractured core sample; a water invasion experiment is performed on the at least one fractured core sample; and the numerical model parameters are calibrated based on the water invasion experiment.

According to another aspect of the invention, a system for modeling a characteristic of a subsurface region is disclosed. The system includes a core vessel configured to contain at least one core sample obtained from subsurface, wherein the vessel is configured to subject the at least one core sample to at least one of: high pressure, high temperature, or water invasion. The system also includes at least one processor configured to execute computer instructions to perform functions including to: input parameters to create a numerical model using characteristics associated with a subsurface region; input physical characteristics of at least one core sample obtained from the subsurface region; input physical characteristics of the at least one core sample after an artificial fracture is created on the sample and the sample is subjected in the vessel to high pressure, high temperature, or water invasion; compare the physical characteristics of the at least one core sample before and after artificial fracturing and subjection to high pressure, high temperature, or water invasion; and calibrate the numerical model parameters based on the comparison of the physical characteristics of the at least one core sample.

According to another aspect of the invention, a computer-readable medium is disclosed. In this embodiment, the computer-readable medium embodies instructions for modeling a characteristic of a subsurface region which when executed by a computer cause the computer to perform a plurality of functions, including functions to: input parameters to create a numerical model using characteristics associated with a subsurface region; input physical characteristics of at least one core sample obtained from the subsurface region; input physical characteristics of the at least one core sample after an artificial fracture is created on the sample and the sample is subjected in a vessel to high pressure, high temperature, or water invasion; compare the physical characteristics of the at least one core sample before and after artificial fracturing and subjection to high pressure, high temperature, or water invasion; and calibrate the numerical model parameters based on the comparison of the physical characteristics of the at least one core sample.

BRIEF DESCRIPTION OF THE DRAWINGS

The following figures are included to further demonstrate certain aspects of the present disclosure and should not be used to limit the claimed subject matter. It should be understood that embodiments of the present disclosure are not limited to the precise arrangements and configurations shown in the figures. Also, the figures are not necessarily drawn to scale, and certain features may be shown exaggerated in scale or in generalized or schematic form, in the interest of clarity and conciseness. The same reference numerals in the figures may identify similar elements, wherein:

DETAILED DESCRIPTION

The following detailed description of example embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time consuming, would nevertheless be a routine undertaking for persons of ordinary skill in the art having the benefit of this disclosure.

Embodiments of this disclosure present efficient techniques for modeling characteristics of subterranean regions using core samples in combined physical and numerical simulation processes. In an example, a complex-fracture carbonate gas reservoir was studied to illustrate the specific application of orthogonal experimental design combining physical simulation with numerical simulation in water invasion mechanisms and dynamic analysis of complex carbonate gas reservoirs.

The present disclosure introduces numerical simulation work in an orthogonal experimental design that provides advantages over conventional modeling techniques. The advantages include: decreasing the workload of physical simulation and reducing the number of cores used for experimentation; realizing mutual verification between physical simulation and numerical simulation; and decreasing the number of repetitive physical simulation experiments and enhancing analysis efficiency and economic benefit by replacement of conventional physical simulations with reliable numerical simulations.

Orthogonal experimental design is a design method suitable for analyzing multiple factors under multiple levels. The design is performed on some representative samples selected from a full and systematic experiment according to orthogonality. These representative sample points show characteristics of homodisperse, homogenesis, and comparability. The orthogonal experimental design method increases experiment efficiency and experimental analysis is completed in a fast and economic way. The orthogonal design is performed on some representative samples selected from a full and systematic experiment according to orthogonality.

Figure 1:
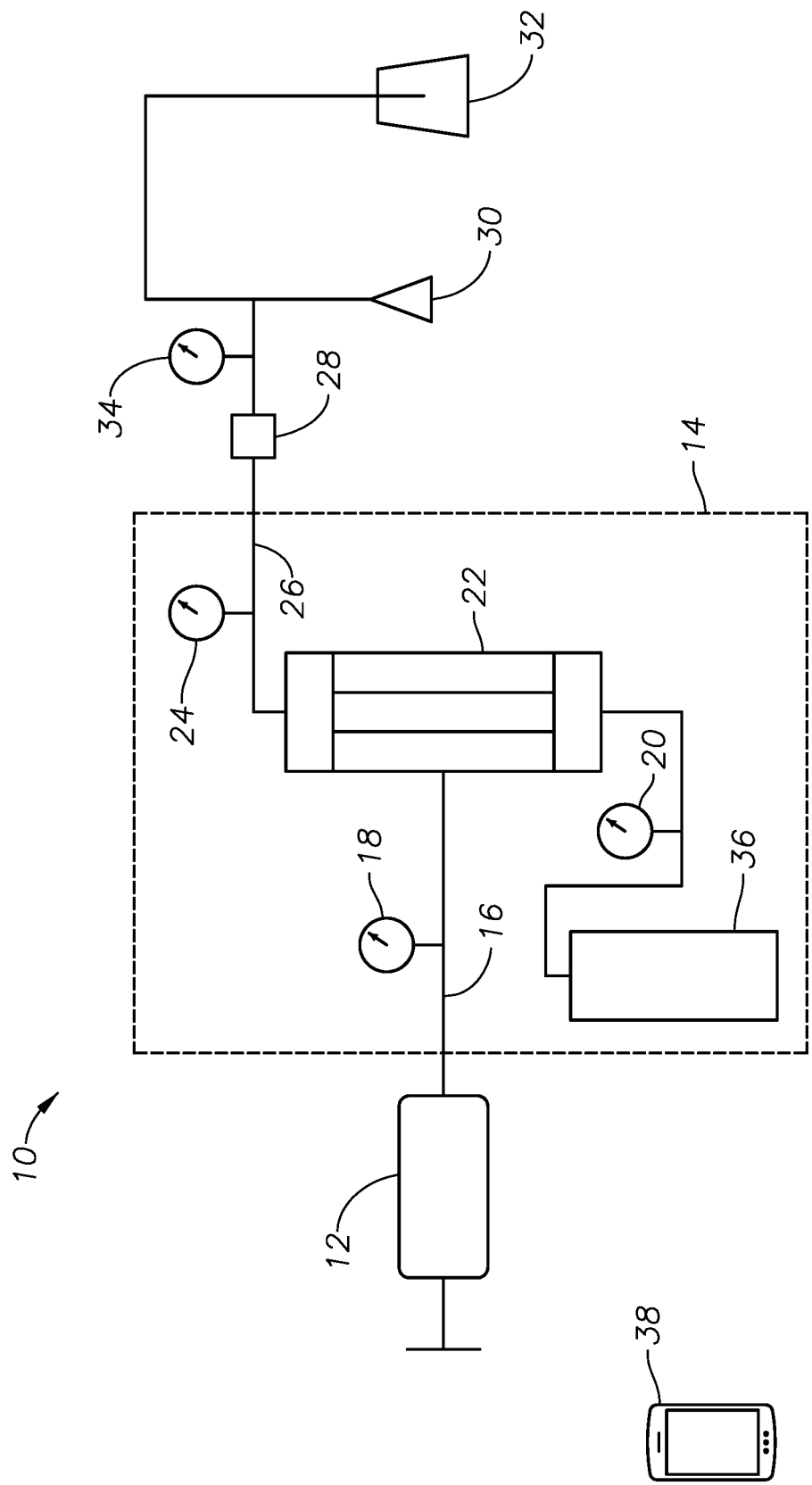
FIG. 1 depicts a schematic of a system for carrying out physical experiments on core samples according to examples of the present disclosure.

Embodiments of the present disclosure resolve problems and difficulties encountered by previous conventional modeling techniques, including: performing artificial fracturing to obtain a physical model of the equivalent permeability and fracture penetration degree of a fractured core set in orthogonal experiments; performing physical simulation experiments under unconventional (extreme) conditions such as high temperature, high pressure, strong reservoir heterogeneity caused by high fracture conductivity and fractured water channeling caused by large water bodies; completing the conversion from physical simulation to numerical simulation and calibration of physical parameters of the numerical simulation model; substituting some physical simulation with reliable numerical simulation to improve the efficiency and economic benefits offered via repeatable physical simulation experiments. Embodiments of this disclosure apply an optimization of backward sequencing of orthogonal experiments carried out by using a limited number of full-diameter core samples obtained from the subsurface region of interest. FIG. 1 depicts a system 10 for carrying out physical experiments or physical simulations on core samples in accordance with the disclosed techniques. The system 10 is used for the physical testing of full-diameter core samples at high temperatures and high pressures, subjecting the cores to water invasion and gas flow experimentation.

In the system 10, a pressure pump 12 is coupled to a thermostat 14 through a pipeline 16. The thermostat 14 is equipped with a confining pressure gauge 18, an inlet pressure gauge 20, a core vessel 22 and an outlet pressure gauge 24. Pressure pump 12 is coupled with the core vessel 22 through the pipeline 16, and confining pressure gauge 18 is disposed on the pipeline 16 between them. The outlet pressure gauge 24 is coupled into a pipeline 26 at the outlet end of the core vessel 22. The core vessel 22 is linked to a back-pressure controller 28 through the pipeline 26. The back-pressure controller 28 is coupled with a gas-water separator 30 and a gas flow meter 32 through the pipeline 26. A back-pressure meter 34 is installed on the pipeline 26 at the inlet end of the gas-water separator 30. A fluid tank 36 is also coupled to the inlet end of the core vessel 22 through a pipeline, and the inlet pressure gauge 20 is installed on the pipeline between them. In some embodiments, the fluid tank 36 is filled with fluid (e.g. water) obtained from subsurface. A computer 38 is linked to the system 10 and configured with a microprocessor and memory that can be programmed to perform the steps and processes disclosed herein. The computer 38 is also configured with a display to provide a visual output of the experimentation and modeling results. The computer 38 may be implemented by, for example, a mobile phone, a tablet, a laptop computer, a desktop computer, an electronic notepad, a server computing device, etc. It will be appreciated by those skilled in the art that conventional hardware and components (e.g., pipes, gauges, pumps, etc.), as well as conventional software and computer systems may be used to implement the embodiments of this disclosure. It will also be appreciated that programming of the computer 38 can be implemented via any suitable computer language coding in accordance with the techniques disclosed herein.

According to relevant factors that may affect the experimental results, an orthogonal experimental table and the physical and numerical simulation experiments of the experimental process were designed. To ensure quantitative correlation of the simulation experiments in the model design analysis, first the main factors that influence water invasion of gas reservoirs are extracted (e.g., fracture permeability, fracture dip angle, fracture penetration degree, water volume). The model parameter level values of the factors are then set according to actual on-site subsurface characteristics or conditions. Corresponding physical simulation and numerical simulation experiments are then performed.

Considering the experiment comparability, core sample quantity and experiment cost, three factor level values were adopted in the analysis. Thus, an orthogonal experiment sheet of four factors at three levels was adopted to implement an embodiment. An experiment on water invasion mechanisms of complex-fracture carbonate gas reservoirs was based on gas/water (two-phase) flow experiments of true reservoir full diameter cores, to conduct a simulation analysis of gas well water yield mechanisms and water yield dynamic rules under different influence factor parameters. The considered factors and parameter levels are shown in Table 1. The level values of various factors in the parameter list can be adjusted in combination with field practice.

TABLE 1

List of Orthogonal Parameters

| Level value | Fracture permeability | Fracture dip angle (°) | Fracture penetration degree (ratio) | Aquifer region multiples |
|---|---|---|---|---|
| 1 | Low | 90 | 1 | 5 |
| 2 | Moderate | 45 | 3/4 | 10 |
| 3 | High | 0 | 1/2 | 30 |

Modeling embodiments were implemented with limited core samples and considering the convergence of numerical simulation. An orthogonal experimentation sheet used in embodiment implementations is shown in Table 2.

TABLE 2

Orthogonal Experiment Sheet

| Case | Fracture Permeability (mD) | Fracture Dip Angle (°) | Fracture Penetration Degree (ratio) | Aquifer Region Multiples | Experiment Implementation Mode |
|---|---|---|---|---|---|
| 1 | Low | 90 | 1 | 5 | Physical and numerical |
| 2 | Low | 45 | 3/4 | 10 | Numerical |
| 3 | Low | 0 | 1/2 | 30 | Numerical |
| 4 | Medium | 90 | 3/4 | 30 | Physical |
| 5 | Medium | 45 | 1/2 | 5 | Physical |
| 6 | Medium | 0 | 1 | 10 | Physical and Numerical |
| 7 | High | 90 | 1/2 | 10 | Physical and Numerical |
| 8 | High | 45 | 1 | 30 | Physical |
| 9 | High | 0 | 3/4 | 5 | Numerical |

Extreme simulation conditions (e.g., flow conductivity is much higher in fractures than in a matrix and the fracture penetration degree is high, fractures are in direct contact with bottom water, multiples of the aquifer region and aquifer region capacity both impact the convergence of numerical simulation calculations) generally lead to unstable and unreliable numerical simulation calculation results. Thus, for some of the experimental cases physical simulation experiments are recommended. Considering experimental cost, limited quantity of comparable full diameter core samples and the limited experimental cycles, numerical simulation experiments can be performed to replace some of the physical simulation experiments under normal conditions in the orthogonal modeling embodiments. The normal conditions refer to relatively low fracture permeability, fracture penetration degree, and aquifer region multiples.

Mutual verification and alternative implementation of numerical simulation and physical simulation are now described. As there are limitations regarding core quantity, experiment cycling, and experimentation cost, the nine experiment Cases of Table 2 cannot all realize physical simulation. Under extreme conditions (such as a large aquifer region, high fracture penetration degree, difficult numerical simulation), physical simulation experiments were adopted in Cases 1 and 4-8. For experiment Cases 1 and 7 with weak anisotropism and low water volume, a comparative analysis of numerical simulation was conducted to determine the matching and fitting of the value of equivalent fracture cell permeability in numerical simulation and physical simulation experiment results.

Figure 2:
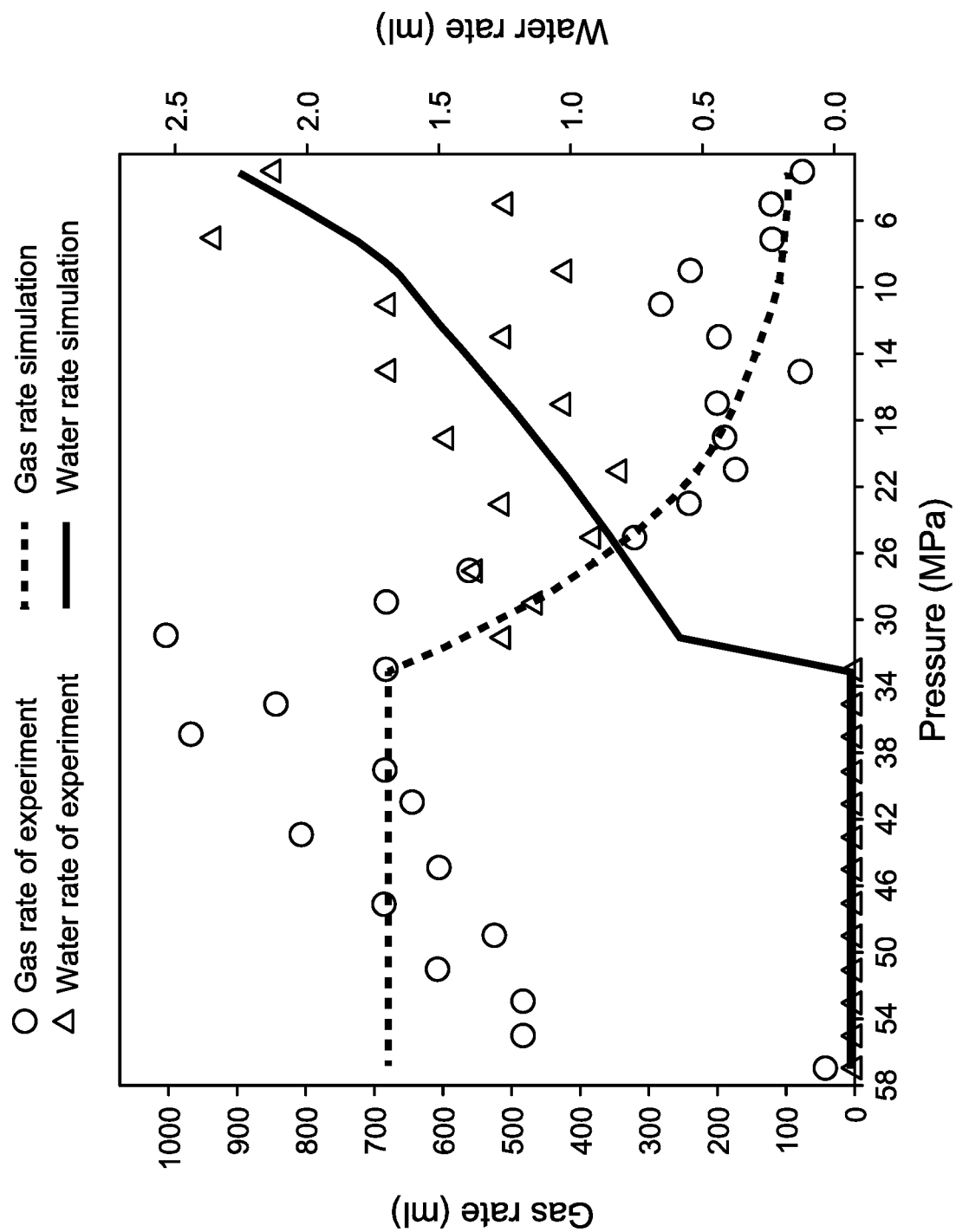
FIG. 2 depicts a graphical comparison between stage gas and water production simulation results and physical experiments produced according to an embodiment of the present disclosure.
Figure 3:
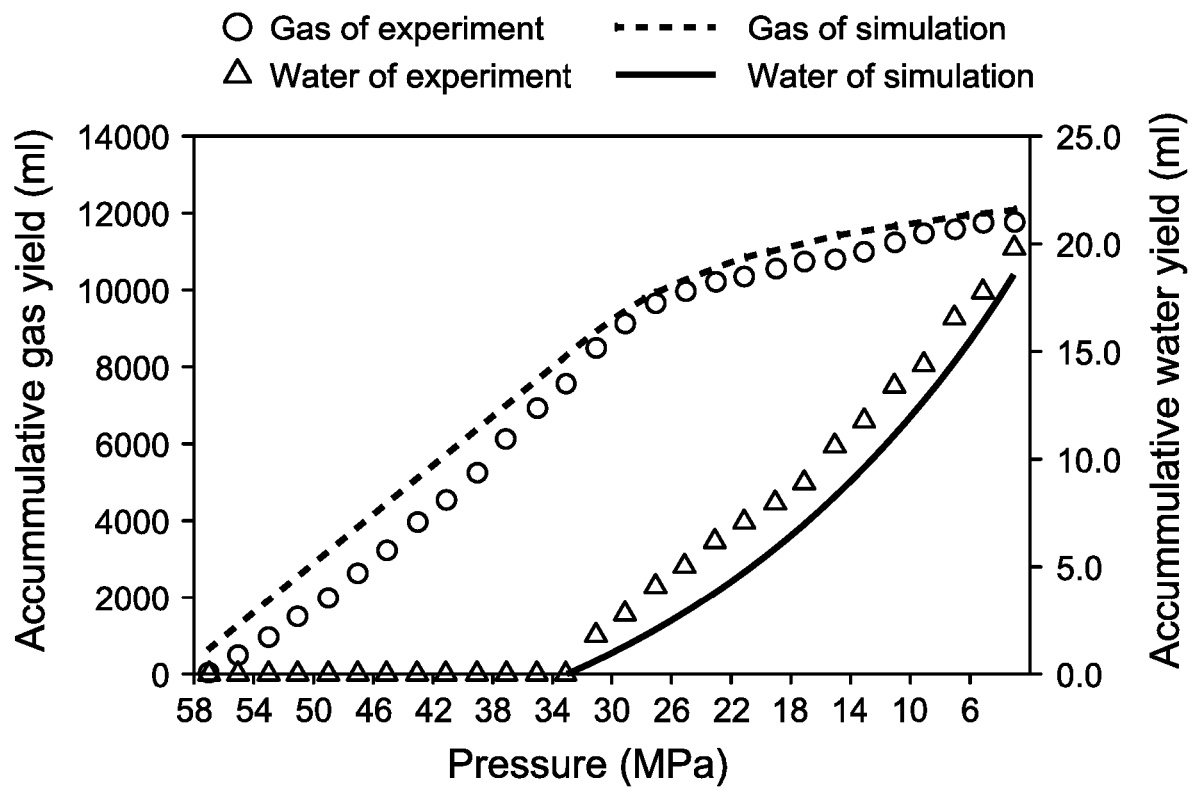
FIG. 3 depicts a graphical comparison between accumulative gas and water production simulation results and physical experiments produced according to an embodiment of the present disclosure.
Figure 4:
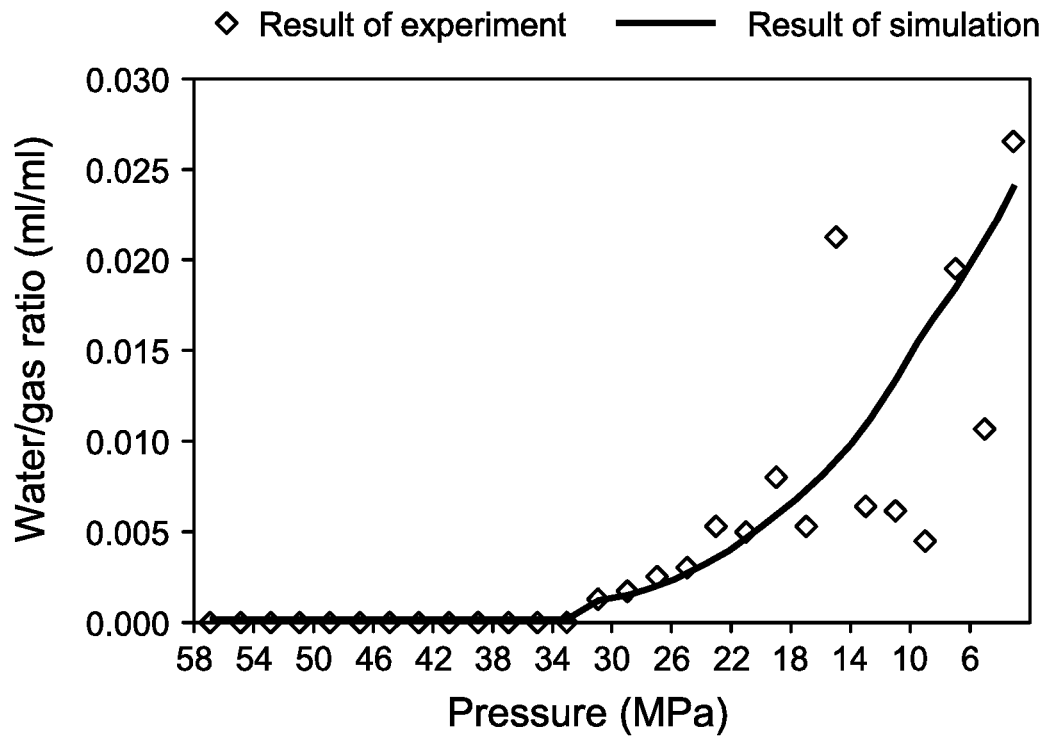
FIG. 4 depicts a graphical comparison between water/gas ratio simulation results and physical experiments produced according to an embodiment of the present disclosure.

FIGS. 2-4 graphically depict comparative results between numerical simulation and physical simulation in accordance with the disclosed modeling embodiments. In physical simulation, the equivalent permeability of the core of the full-diameter core after the support of the core was 50 mD, the fracture grid permeability corresponding to the modeled grid size was set to 990 mD. Other parameters, such as fracture dip angle, penetration degree and aquifer region multiples, were kept the same, which facilitated the fitting and matching of physical simulation and numerical simulation results. FIG. 2 depicts a comparison between stage gas and water production simulation results and physical simulation. FIG. 3 depicts a comparison between accumulative gas and water production simulation results and physical simulation. FIG. 4 depicts a comparison between water/gas ratio simulation results and physical simulation.

Taking Case 1 as an example, the parameters of the numerical simulation were set as shown in the Table 3.

TABLE 3

Numerical Model Parameter Table

| | |
|---|---|
| Matrix grid size | 3 mm × 1.5 mm × 3 mm |
| Fracture grid size | 0.6 mm × 0.3 mm × 0.6 mm |
| Number of matrix grids | 13056 |
| Number of fracture grids | 4080 |
| Model radius | 50 mm |
| Model length | 70 mm |
| Porosity | 13.65% |
| Core volume | 78 ml |
| Matrix permeability | 1 mD |
| Fracture permeability | 990 mD |

Implementations of the modeling embodiments can be carried out with a single core sample. However, in some embodiments multiple core samples with similar physical properties (e.g., from same subsurface region, same horizon, similar porosity and permeability parameters) are preferably selected and prepared into cylinder shaped full-diameter core samples with similar geometric dimensions. In an embodiment, core samples were prepared into full-diameter cores with a diameter of 70-110 mm and a length of 60-100 mm. The core samples' porosity and permeability parameters were tested and the pore volume was calculated. Irreducible water saturation was established and irreducible water volume was calculated. If similar irreducible water saturations can be established in different cores before fracturing (the difference lower than 3%), this is also a criterion to determine whether core samples have similar physical properties.

A modeling embodiment combining physical simulation and numerical simulation using core samples includes: (1) Extracting the main factors that influence water invasion of gas reservoirs. According to actual on-site conditions set initial model parameter level values of the factors, and then perform an orthogonal experiment combining physical with numerical simulations. (2) For physical simulation, select one or more (ideally three, two for experimentation, one for backup) core samples with similar physical properties, prepare them into cylinder-shaped full-diameter core samples with similar geometric dimensions, test core porosity, permeability, and calculate core pore volume(s). (3) Artificially fracture the core(s), fill the core fracture(s) with proppants, test fractured core permeability as per the orthogonal experiment sheet, and combine the fractured core with the non-fractured core to obtain combined physical simulation experiment models with different equivalent permeability values and fracture penetration degree as set by the simulation scheme. (4) Establish irreducible water saturation for the corresponding modeling schemes, calculate the irreducible water volume and original gas amount, and perform water invasion physical simulation experiments on the core(s). (5) Perform a comparison between physical simulation and numerical simulation: after physical simulation of artificially fractured core under some non-extreme conditions, perform corresponding numerical simulation fitting and calibration, i.e., adjust the fracture cell permeability during numerical simulation, so as to realize a fitting of the numerical and physical simulation results. (6) By synchronous fitting and calibration, establish relationship charts or formulas between the equivalent fracture cell permeability of the numerical model and the equivalent core permeability in physical simulation experiments; with the charts or formulas as reference basis, complete subsequent orthogonal experimental simulation.

Figure 5:
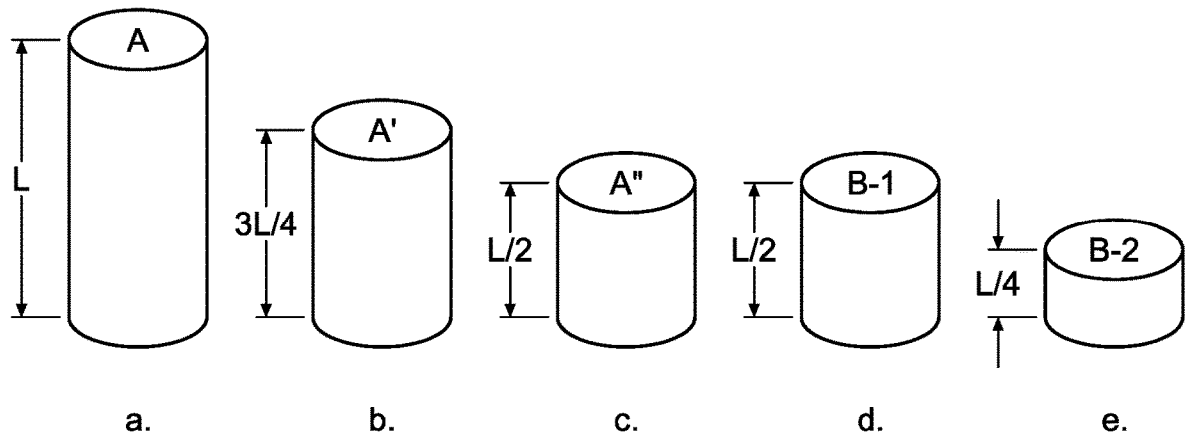
FIG. 5 depicts a schematic of core samples in various sizes according to examples of the present disclosure.

FIG. 5 depicts example core samples prepared to complete an orthogonal modeling experiment in an embodiment. The core samples have similar geometric dimensions, porosity, and permeability parameters. Artificial fractures were made in some of the core samples, and some of the cores were cut as depicted in FIG. 5. As known by those skilled in the art, artificial fracturing and core cutting can be carried out in various ways using hand tools or machinery. Typical rock core samples are relatively easy to damage (i.e. fracture). The core samples in FIG. 5 can be used to complete the orthogonal modeling embodiments as depicted in Table 2 above.

An example modeling embodiment can be carried out with the core samples depicted in FIG. 5, as follows: (1) Select full diameter core A to complete the physical simulation experiment without fractures. Test the core's porosity, permeability, and calculate its pore volume. The experiment results can be taken as a contrast sample of the simulation experiment with the fractured sample(s). (2) Perform artificial fracturing on Core A. (3) Fill fractured core sample with supporting proppants of variable grain size (grain diameters), using different materials (e.g., quartz sand, composite material, etc.) and proppant particles with different concentrations (fracture surface concentration ($mg/mm^2$)). (4) Test the porosity and permeability parameters on the full diameter fractured core after different filling schemes are implemented, so as to obtain fractured sample models representing permeability parameters and complete whole-process physical simulation experiments (e.g. of Case numbers 1, 6, and 8 in Table 2). Establish a relationship chart or formulas associating the numerical model parameters and the physical experiment parameters. (5) Clean core A used in the whole-process physical simulation experiment and cut ¼ of the core length to obtain core sample A' in FIG. 5. (6) Cut another full diameter core sample into B-1 with ½ length and B-2 with ¼ length, respectively as shown in FIGS. 5d and 5e. (7) Prepare core sample A' into a model with the same permeability as Case number 6 in Table 2 and ¾ of cross-cutting, using the same grain size and dosage per unit of supporting proppants in Case number 6. (8) Combine core samples A' and B-2 and complete the physical simulation experiment in Case number 4 in Table 2. (9) Clean core sample A' in Case number 4. Cut the sample into core sample A" as shown in FIG. 5c. (10) Prepare core sample A" into a model with the same permeability As Case number 8 in Table 2 and ½ of penetration, using the same grain size and dosage per unit of backup proppants in Case number 8. Combine Samples A" and B-1 and complete the physical simulation experiment in Case number 7. Update the relationship chart or formulas associating the numerical model parameters and the physical experiment parameters.

A matching scheme of fractured permeability is now described. For artificial fractures, if fracture end faces are not filled, the obtained artificial fractures usually have relatively low permeability values, particularly when stress exists, as fracture permeability is closely correlated to fracture openness. Artificial fractures without supporting proppants under confining pressure have effective permeability decreasing with increasing stress. According to the equivalent percolating resistance theory: when two rock blocks have the same geometric dimension, other percolating conditions are also the same (e.g., pressure difference and fluid viscosity). If the two blocks have the same percolating resistance, flow quantity should also be same. Fracture percolating and the flow media with corresponding equivalent dimension meet the following relationship:

$$\frac{A\phi_f b^2}{12\mu}\frac{dp}{dx} = \frac{K_f A}{\mu}\frac{dp}{dx} \quad (1)$$

$$K_f = \frac{\phi_f b^2}{12}, \quad (2)$$

where, A is the cross-sectional area (cm$^2$); $\phi_f$ is the fracture porosity (decimal); b is the fracture width (cm); μ is the dynamic liquid viscosity (mPa·s);

$\frac{dp}{dx}$ is the pressure gradient (MPa/cm); $K_f$ is the fracture permeability (cm$^2$). The parameters in the equations (1) and (2) are from a CGS system, for the SI system, then $$K_f = \phi_f b^2 \frac{10^8}{12} = 8.33 \times 10^6 \phi_f b^2, \quad (3)$$

where, $K_f$ is the fracture permeability (μm$^2$); $\phi_f$ is the fracture porosity (decimal); b is the fracture width (cm).

Equation (3) is commonly used for calculating single fracture permeability, i.e., for pure fractures without fillings, the formula can be used to calculate single planar fracture permeability. By adoption of the disclosed modeling embodiments, different fracture openness values can be set to calculate the true permeability of single fractures, as well as equivalent core permeability after core flow experiment measurement and fracturing. Therefore, multiple adjustment of fracture openness values is usually needed for obtaining a fractured core with certain equivalent core permeability. Generally, for full diameter core simulation, the numerical simulation model of fracture size is mm-level, the size of real fracture openness is μm, which has three orders of magnitude difference between fracture size of real and simulation. Local infilling can decrease the difference to two orders of magnitude. If further infilling is conducted, extremely small cells will appear, greatly decreasing the convergence of the model calculation. Thus, for true fractures, although local infilling is performed at a core scale, equivalent processing of fracture cell permeability may still be needed in the numerical simulation process. Adjusting fracture cell permeability can realize the fitting of physical simulation experiment indexes (yield and pressure), i.e., to complete parameter calibration of physical simulation experiments to numerical simulation experiments, to determine the relationship between equivalent fracture cell permeability in numerical simulation and equivalent fractured core permeability in physical simulation experiments.

In an example modeling embodiment where matrix permeability is 1 mD, Table 4 shows the established relationship between equivalent permeability of a fracture cell and equivalent permeability of a fractured full diameter core in physical simulation experiments.

TABLE 4

Relationship between fracture cell permeability of numerical simulation and equivalent full diameter core permeability

| Theoretical Equivalent Permeability of Fracture Cell $k_{eff, cell}$ (mD) | Equivalent Permeability of Full Diameter Core $K_e$ (mD) |
|---|---|
| 5230 | 199 |
| 2120 | 98 |
| 990 | 52 |
| 310 | 19 |
| 170 | 10 |

Figure 6:
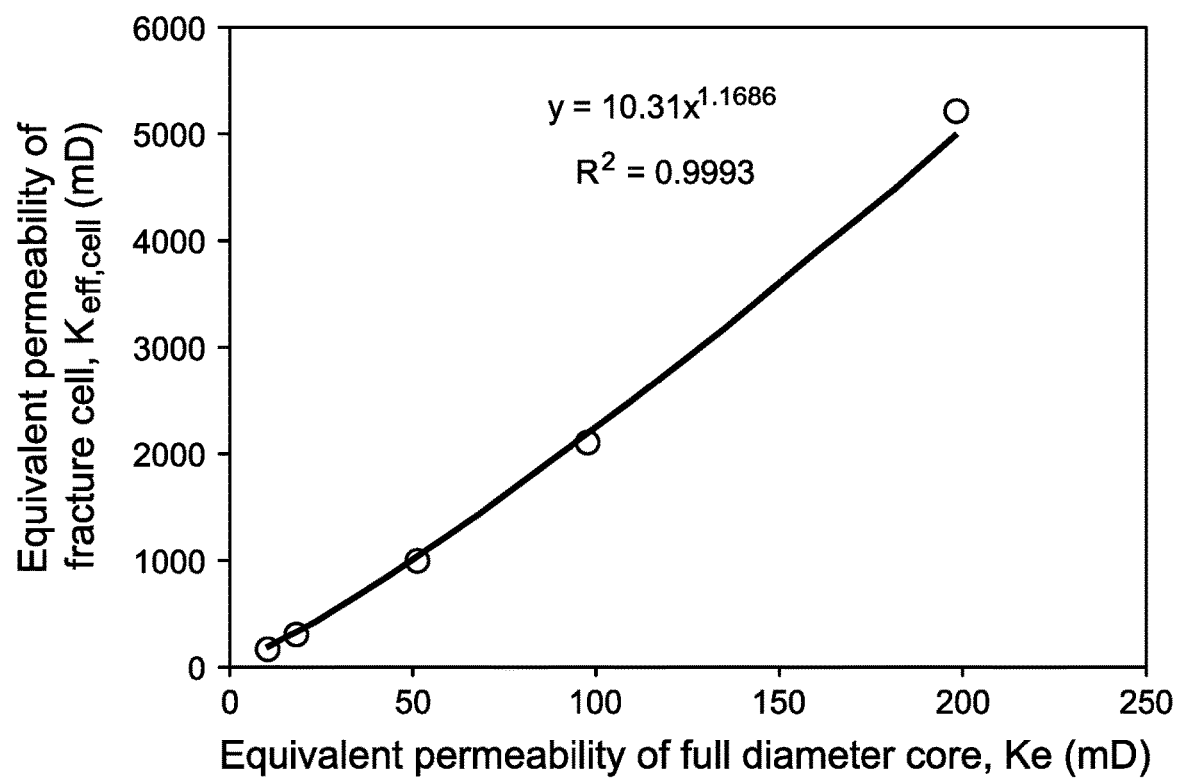
FIG. 6 depicts a graphical correlation between equivalent fracture cell permeability in a numerical simulation model and fractured full diameter core equivalent permeability in a physical simulation experiment produced according to an embodiment of the present disclosure.

FIG. 6 depicts the correlation between equivalent fracture cell permeability in the numerical simulation model and fractured full diameter core equivalent permeability in the physical simulation experiment of the embodiment relating to Table 4. Table 4 can be used to establish the following regression equation of equivalent permeability of the fracture in numerical simulation and equivalent full diameter core permeability in physical simulation experiments.

$$K_{eff}, cell = 10.31 K_e^{1.1686} \quad (4)$$

When a fracture model without fillings is employed, a fracture aperture can be supported by a locally placed support (e.g. propping agents) to avoid core damage by stress variation during experimentation. Keeping the confining pressure and internal pressure synchronous also helps keep core stress stable and reduces the influence of fracture physical property parameters from stress sensitivity.

Figure 7:
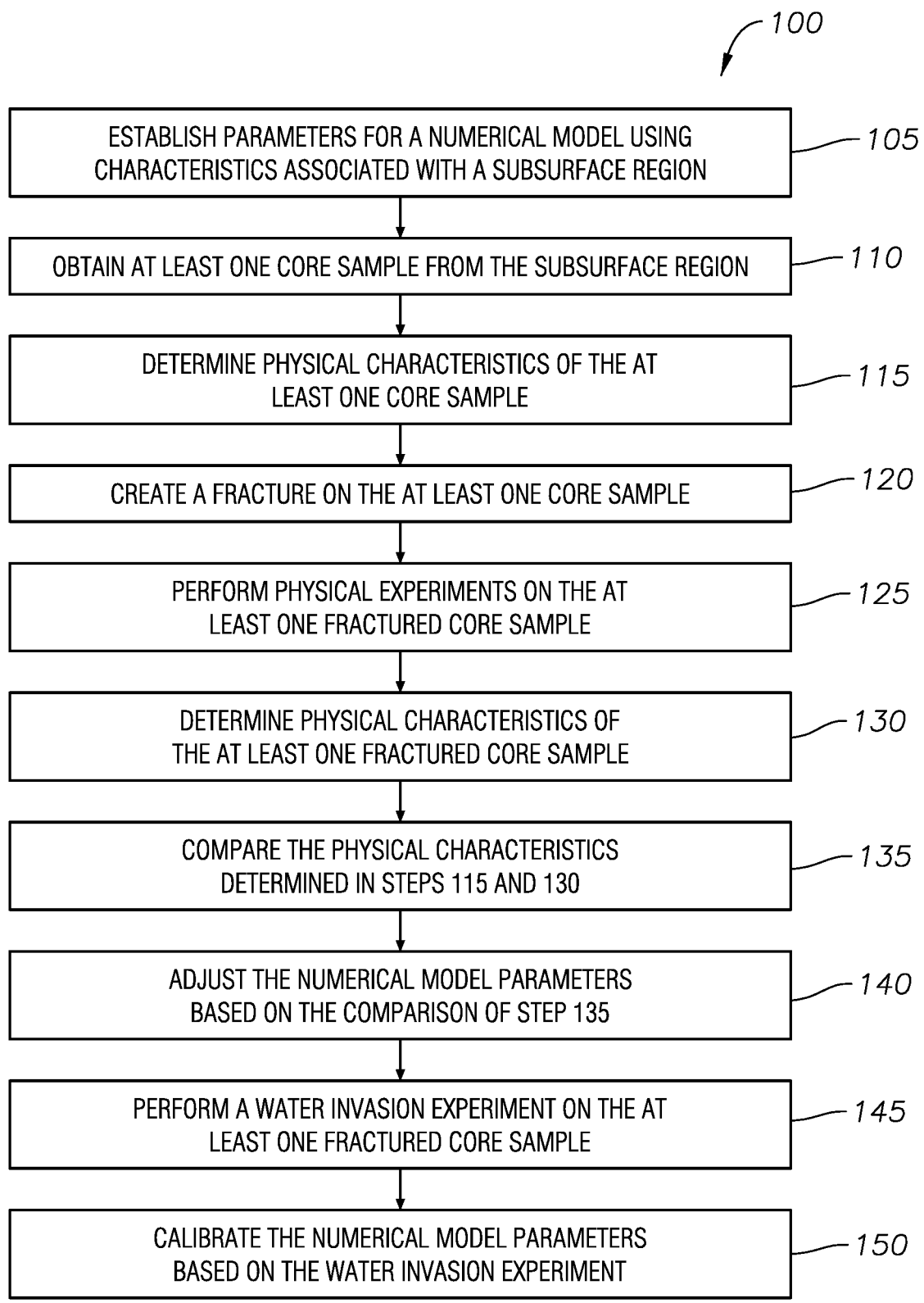
FIG. 7 depicts a flow diagram illustrating a process for modeling a characteristic of a subsurface region according to examples of the present disclosure.

FIG. 7 depicts an example flow diagram 100 showing an illustrative process for modeling a characteristic of a subsurface region in accordance with the embodiments disclosed herein. At step 105, parameters for a numerical model are established using characteristics associated with a subsurface region. At step 110, at least one core sample is obtained from the subsurface region. At step 115, physical characteristics of the at least one core sample are determined. At step 120, a fracture is created on the at least one core sample. At step 125, physical experiments are performed on the at least one fractured core sample. At step 130, physical characteristics of the at least one fractured core sample are determined. At step 135, the physical characteristics determined in steps 115 and 130 are compared. At step 140, the numerical model parameters are adjusted based on the comparison of step 135. At step 145, a water invasion experiment is performed on the at least one fractured core sample. At step 150, the numerical model parameters are calibrated based on the water invasion experiment.

The disclosed modeling techniques presented systematic orthogonal experiment designs using limited amounts of full diameter core samples, which not only ensure representative experimental sample points are homogeneous, disperse, and comparable, but also reduce experimentation costs, shorten the experiment cycle, and increase experiment efficiency. Thus, using the dislcosed subsurface characterisic modeling methods combining physical and numerical simulations and aiming at complex fracture carbonate reservoir water invasion mechanisms, a systematic full diameter simulation experimental scheme design was completed, providing an efficient, reliable, and feasible modeling system.

Although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for modeling a characteristic of a subsurface region, comprising:
    a) establishing parameters for a numerical model using characteristics associated with a subsurface region;
    b) preparing a first cylindrical full-diameter core sample obtained from the subsurface region;
    c) creating an artificial fracture in the first core sample;
    d) determining physical characteristics of the first core sample with proppant material disposed in the artificial fracture;
    e) cutting the first core sample to produce a reduced length first core sample including the artificial fracture;
    f) preparing a second cylindrical full-diameter core sample obtained from the subsurface region;
    g) determining physical characteristics of the reduced length first core sample with proppant material disposed in the artificial fracture in combination with the second core sample;
    h) cutting the reduced length first core sample to produce a further reduced length first core sample including the artificial fracture;
    i) preparing a third cylindrical full-diameter core sample obtained from the subsurface region;
    j) determining physical characteristics of the further reduced length first core sample with proppant material disposed in the artificial fracture in combination with the third core sample; and
    k) adjusting the numerical model parameters using the determined physical characteristics from steps (d), (g), and (j) to calibrate a permeability characteristic in the numerical model.

2. The method of claim 1 wherein step (a) comprises extracting factors associated with water invasion of the subsurface region prior to establishing the parameters for the numerical model.

3. The method of claim 1 wherein steps (d), (g), and (j) are performed with the respective core samples disposed in a vessel.

4. The method of claim 3 wherein the vessel is configured to subject the respective core samples to at least one of pressure of at least 70 MPa, temperature of at least 120 degrees Celsius, or water invasion.

5. The method of claim 4 wherein step (k) comprises adjusting the numerical model parameters to achieve a permeability fitting between the numerical model and the results of subjecting at least one of the core samples to pressure of at least 70 MPa or temperature of at least 120 degrees Celsius.

6. The method of claim 1 further comprising performing physical experiments on at least one of the core samples by subjecting the sample to gas invasion.

7. The method of claim 1 further comprising performing physical experiments on at least one of the core samples by subjecting the sample to fluid invasion.

8. The method of claim 7 wherein the fluid invasion comprises fluid from the subsurface region.

9. The method of claim 1 further comprising establishing relationship charts or formulas associating permeability characteristics in the numerical model with permeability characteristics from the determined physical characteristics of step (d), (g), and/or (j).

10. The method of claim 1 wherein step (e) comprises cleaning the first core sample before cutting the first core sample and step (h) comprises cleaning the reduced length first core sample before cutting the reduced length first core sample.

11. A system for modeling a characteristic of a subsurface region, comprising:
    a first cylindrical full-diameter core sample obtained from a subsurface region;
    a second cylindrical full-diameter core sample obtained from the subsurface region;
    a third cylindrical full-diameter core sample obtained from the subsurface region;
    at least one processor configured to execute computer instructions to perform functions including to:
      input parameters to create a numerical model using characteristics associated with the subsurface region;
      input physical characteristics of the first cylindrical full-diameter core sample after an artificial fracture is created in the sample and proppant material is disposed in the fracture;
      input physical characteristics of the second core sample in combination with the first cylindrical full-diameter core sample after the first sample is cut to a reduced length first core sample with proppant material disposed in the artificial fracture after an artificial fracture;
      input physical characteristics of the third core sample in combination with the reduced first cylindrical full-diameter core sample after the first sample is cut to a further reduced length first core sample with proppant material disposed in the artificial fracture; and
      calibrate adjust the numerical model parameters to achieve a fitting between permeability characteristics in the numerical model and the permeability characteristics from the comparison of the using all of the input physical characteristics of the respective core samples to calibrate a permeability characteristic in the numerical model of the at least one core sample.

12. The system of claim 11 wherein factors associated with water invasion of the subsurface region are extracted prior to inputting parameters to create the numerical model.

13. The system of claim 11 wherein the physical characteristics of the respective core samples are determined with the samples disposed in a vessel.

14. The system of claim 13 wherein the vessel is configured to subject the core samples to at least one of pressure of at least 70 MPa, temperature of at least 120 degrees Celsius, or water invasion.

15. The system of claim 14 wherein the function to adjust the numerical model parameters comprises adjustment of the numerical model parameters to achieve a permeability fitting between the numerical model and the results of subjecting at least one of the core samples to pressure of at least 70 MPa or temperature of at least 120 degrees Celsius.

16. The system of claim 11 wherein the physical characteristics of the respective core samples are determined by performing physical experiments on at least one of the core samples by subjecting the sample to gas invasion.

17. The system of claim 11 wherein the physical characteristics of the respective core samples are determined by performing physical experiments on at least one of the core samples by subjecting the sample to fluid invasion.

18. The system of claim 17 wherein the fluid invasion comprises fluid from the subsurface region.

19. The system of claim 11 wherein the at least one processor is further configured to execute computer instructions to establish relationship charts or formulas associating permeability characteristics in the numerical model with permeability characteristics determined by performing physical experiments on at least one of the core samples.

20. A non-transitory computer-readable medium, embodying instructions for modeling a characteristic of a subsurface region which when executed by a computer cause the computer to perform a plurality of functions, including functions to:

input parameters to create a numerical model using characteristics associated with a subsurface region;

input physical characteristics of a first cylindrical full-diameter core sample obtained from the subsurface region after an artificial fracture is created in the sample and proppant material is disposed in the fracture;

input physical characteristics of a second core sample obtained from the subsurface region in combination with the first cylindrical full-diameter core sample after the first sample is cut to a reduced length first core sample with proppant material disposed in the artificial fracture;

input physical characteristics of a third core sample obtained from the subsurface region in combination with the reduced first cylindrical full-diameter core sample after the first sample is cut to a further reduced length first core sample with proppant material disposed in the artificial fracture; and adjust the numerical model parameters using all of the input physical characteristics of the respective core samples to calibrate a permeability characteristic in the numerical model.

* * * * *